United States Patent [19]
Bahder et al.

[11] 4,365,947
[45] Dec. 28, 1982

[54] APPARATUS FOR MOLDING STRESS CONTROL CONES INSITU ON THE TERMINATIONS OF INSULATED HIGH VOLTAGE POWER CABLES

[75] Inventors: George Bahder; Carlos Katz, both of Edison; Attila F. Dima, Piscataway; Adolf S. Knott, Roselle, all of N.J.

[73] Assignee: GK Technologies, Incorporated, General Cable Company Division, Greenwich, Conn.

[21] Appl. No.: 924,873

[22] Filed: Jul. 14, 1978

[51] Int. Cl.³ .................. B29C 3/00; B29C 27/22; H01B 17/12; H02G 7/04
[52] U.S. Cl. .................... 425/384; 156/47; 425/407; 425/446; 264/272.17
[58] Field of Search ............ 425/384, 407, 408, 445, 425/446, 346, 348 S; 156/47, 48, 49; 174/23 R, 23 SC, 84 R, 93; 249/158, 162; 264/272

[56] References Cited

U.S. PATENT DOCUMENTS

| | | | |
|---|---|---|---|
| 1,348,669 | 8/1920 | Talbot | 425/446 X |
| 1,693,365 | 11/1928 | Boyle et al. | 174/84 R X |
| 2,272,615 | 2/1942 | Scott et al. | 156/48 |
| 2,282,003 | 5/1942 | Scott et al. | 156/48 X |
| 2,286,716 | 6/1942 | Clark | 425/445 |
| 2,497,707 | 2/1950 | Wetherill | 264/272 X |
| 2,862,042 | 11/1958 | Bollmeier | 174/93 |
| 2,967,795 | 1/1961 | Bollmeier et al. | 174/84 R |
| 3,017,306 | 1/1962 | Priaroggia | 156/48 |
| 3,356,788 | 12/1967 | Callahan et al. | 174/84 R |
| 3,580,986 | 5/1971 | Misare | 174/73 R |
| 3,652,782 | 3/1972 | Furusawa et al. | 174/73 R |
| 3,711,818 | 1/1973 | Swehla | 174/73 R X |
| 3,761,220 | 9/1973 | Dirne | 425/407 |
| 3,777,048 | 12/1973 | Traut | 174/73 R |
| 3,801,730 | 4/1974 | Nakata et al. | 156/49 X |
| 3,970,488 | 7/1976 | Nelson | 156/49 |
| 4,084,307 | 4/1978 | Schultz et al. | 156/49 X |
| 4,091,062 | 5/1978 | Nelson | 156/49 X |

FOREIGN PATENT DOCUMENTS

| | | | |
|---|---|---|---|
| 237191 | 9/1959 | Australia | 156/48 |
| 239803 | 12/1960 | Australia | 174/76 |
| 639205 | 4/1962 | Canada | 174/73 R |
| 201412 | 3/1908 | Fed. Rep. of Germany | 249/158 |
| 1204384 | 11/1965 | Fed. Rep. of Germany | 156/49 |
| 2555305 | 7/1976 | Fed. Rep. of Germany | 156/49 |
| 47-45785 | 11/1972 | Japan | 174/73 R |
| 120846 | 1/1946 | United Kingdom | 156/47 |
| 1209835 | 10/1970 | United Kingdom | 174/73 R |
| 138737 | 12/1959 | U.S.S.R. | 156/48 |

OTHER PUBLICATIONS

Canada, D. D. "Resin–Glass Tape Cuts Cost of Terminations," In *Electrical World*, Aug. 17, 1959, pp. 62 and 63.

*Primary Examiner*—Philip Anderson
*Attorney, Agent, or Firm*—Hopgood, Calimafde, Kalil, Blaustein & Judlowe

[57] ABSTRACT

This invention relates to stress control cones for terminations of high-voltage power transmission cables. Such cones are used beyond the end of the cable insulation shielding, and for the purpose of providing thicker insulation for reducing the stress at and beyond the unshielded insulation on a high-voltage power cable. This invention builds up greater thickness of insulation beyond the end of the cable insulation shield, preferably by wrapping the cable with layers of insulating tapes that are then heated and fused to one another and to the outside surface of the cable insulation. The hot build-up of additional insulation is fused, or brought to incipient fusion, to merge the build-up to the cable insulation and the build-up layers to one another, instead of using preformed stress relief cones which are unsuitable for very high voltage. The build-up material is shaped to the most effective contour by the application of force from hydraulically-operated molding shapes made of metal and forced against the build-up by hydraulic motors attached to portable shaping apparatus.

14 Claims, 6 Drawing Figures

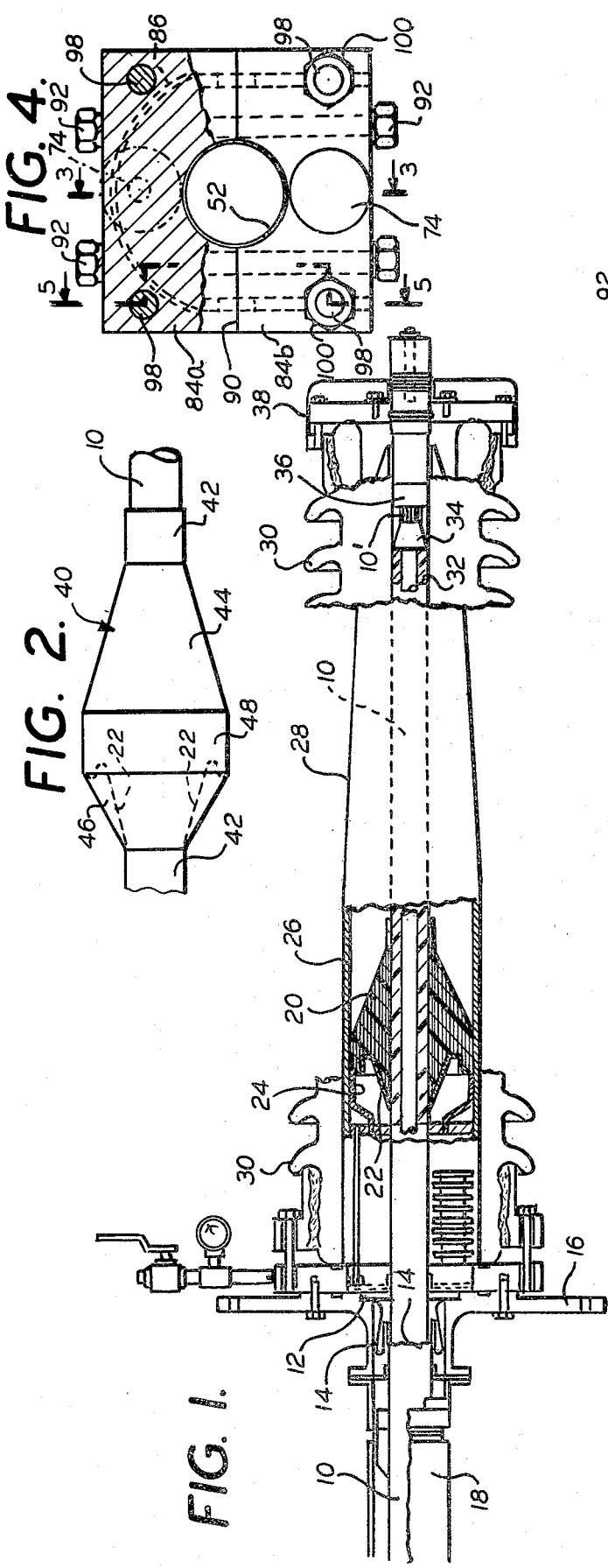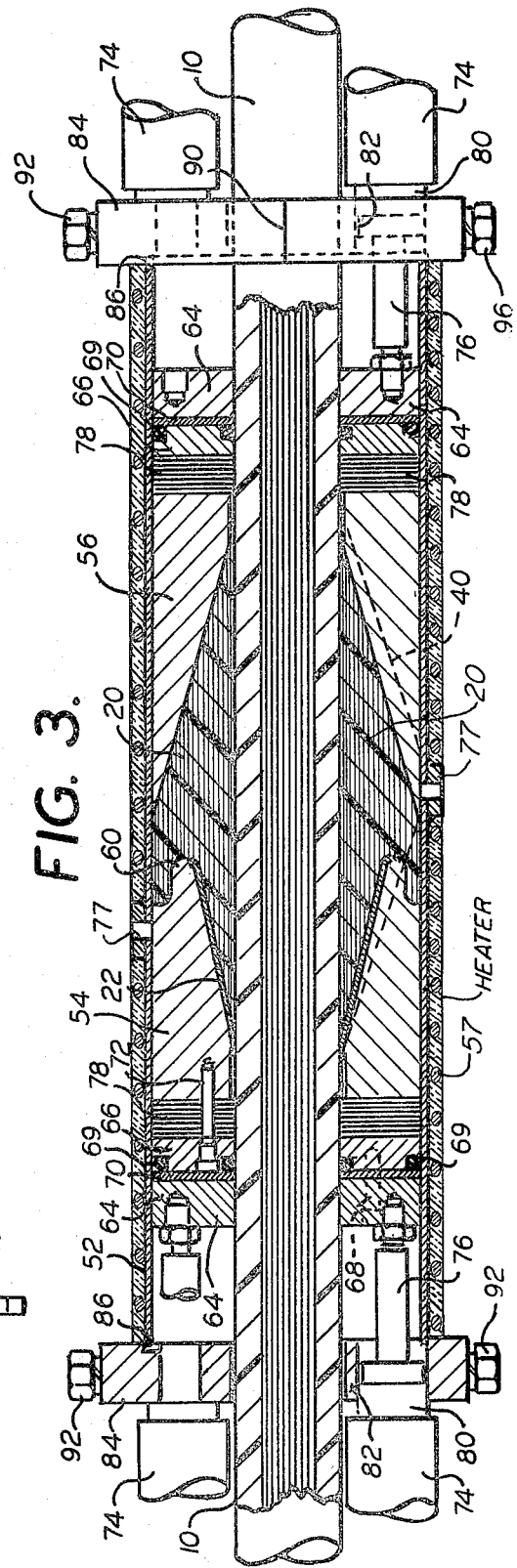

APPARATUS FOR MOLDING STRESS CONTROL CONES INSITU ON THE TERMINATIONS OF INSULATED HIGH VOLTAGE POWER CABLES

BACKGROUND AND SUMMARY OF THE INVENTION

For low voltage cables, stress control cones can be pre-molded in a factory and slipped over the cable in the field. Such pre-molded stress control cones are acceptable also for medium voltage cables having relatively large insulation walls with corresponding low-voltage stresses at their outside. However, they cannot be used with extruded cables of new design, which for the same voltage rating have their wall thicknesses reduced, and therefore, high stresses at their outer surfaces or for very high voltage cables. In these cases, to assure a reliable dielectric system in the termination area, it becomes necessary to assure an intimate contact between the cable insulation and the stress control cone; that is, it becomes necessary to mold the stress cone directly over the insulation without leaving any cavity or harmful contaminant between the original and newly applied insulation. The present disclosure describes a novel apparatus and method for assuring good bond between the components and good performance of the molded stress control cone.

With the utilization of the novel apparatus of the invention, the materials used in the stress cones are preferably the same as used for the extruded cable insulation system with which the stress control cones of this invention are used are molded in the field directly over the insulation, and can also be applied in a factory, on at least the cable ends located at the outside of the shipping reels, and joined in the field with the rest of the insulated cable. Using materials having the same dielectric characteristics as those prevailing in the rest of the cable provides uniformity in stress distribution and allows reduction in size.

Molded stress cones for 138 through 345 kV high-voltage stress extruded dielectric cables are not available at present. Present terminations for extruded type cables rated 138 kV consist of prefabricated stress cones, slipped over the insulation or on hand wrapped tapes which are made to conform to specific design shapes. The prefabricated stress cone type terminations of the prior art utilizes prefabricated slip-on insulation cylinders in conjunction with mechanical loading devices to compress the prefabricated units against the cable insulation. Both terminations are encased in ceramic housings and require highly skilled personnel for proper installation. The space between the cable insulation and the inner surface of the terminal in both cases is filled with an insulating fluid (typically polybutene oil) which prevents partial discharges in that area.

This means of prevention of partial discharges may be adequate at modest voltage stresses appearing at surfaces of present cables (operating below avg. stresses 100 V/mil). However, it is marginal at high-voltage stresses which exist in the high stress cables operating at average stresses of 150–200 V/mil). Both the slip-on type and the hand-wrapped stress cones are sensitive to cable diameter, to position of the components and have a limited dielectric strength. Another deficiency of the present termination is the different thermal expansion factor of its stress control cone components as compared to the thermal expansion factor of the cable insulation. This may lead to discontinuities in the insulation-shielding interface. In this event, partial discharges will develop within the termination area and premature breakdown may occur. Furthermore, this type of termination is sensitive to cable dimensions which vary with temperature. Molded stress control cones, made as an integral part of the cable insulation in accordance with this invention, prevent these deficiencies.

Molding of the stress control cones of this invention onto the cable insulation makes them an integral part of the insulation, consequently lowering the radial voltage stresses at the interface between the cone and the rest of the termination. In addition, these molded stress cones provide the following advantages:

(a) The insulation of the new stress cones is of the same material as the insulation of the cable, therefore, having similar electrical and thermal properties. Under these conditions, the characteristics of the stress cones are similar to that of the cable. This is of special importance at load cycling up to emergency temperatures (130° C.) in cross-linked polyethylene cable systems operating at very high voltage stresses.

(b) The purified insulating compound used in the stress cones contains a minimum of contaminants, thus assuring high dielectric strength of the molded insulation.

(c) Constant high pressure maintained during the heating and cooling time required for molding and curing the insulation assures a uniform, void free insulation build-up.

(d) The new stress cones are much more uniform from a mechanical point of view than the currently used stress cones.

Other objects, features and advantages of the invention will appear or be described as the specification proceeds.

BRIEF DESCRIPTION OF DRAWING

In the drawing, forming a part hereof, in which like reference characters indicate corresponding parts in all the views:

FIG. 1 is a diagrammatic sectional view showing a stress relief cone made in accordance with this invention;

FIG. 2 shows the build-up of additional insulation around a cable as the first step in making a stress relief cone by the apparatus and in accordance with the method of this invention;

FIG. 3 is a sectional view through the apparatus of this invention, the section being taken on the line 3—3 of FIG. 4;

FIG. 4 is an end view, partly broken away and in section, of the apparatus shown in FIG. 3;

DESCRIPTION OF PREFERRED EMBODIMENT

Figure 5:
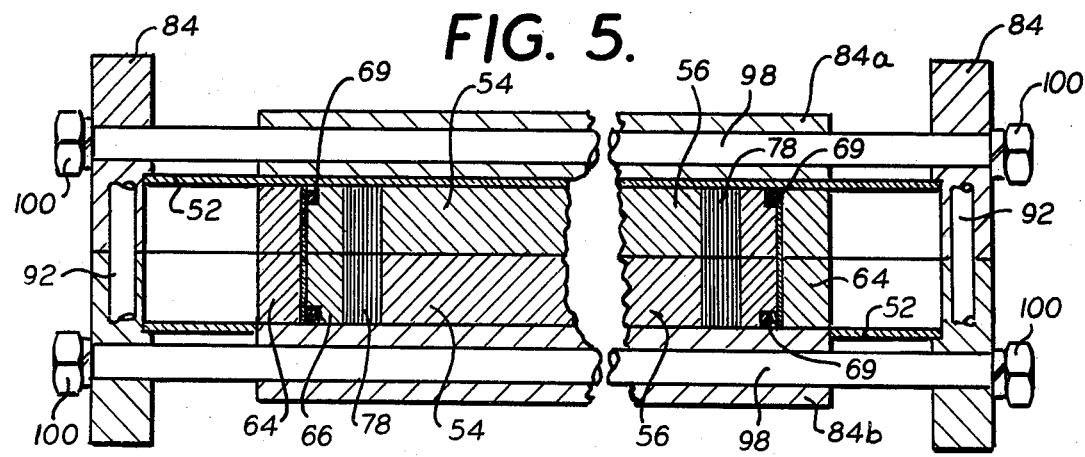
FIG. 5 is a sectional view taken on the line 5—5 of FIG. 4.

FIG. 1 is a diagrammatic view showing a termination of a high-voltage power transmission cable on which the stress control cones made by this invention are used. A shielded power transmission cable 10 is brought to a cable shield grounding plate 12 and the cable shield, designated by the reference character 14, is grounded on the plate 12. A mounting plate 16 is connected with a pipe 18 from which the end of the cable 10 projects.

A stress cone 20 is built on the cable 10 at the location where the semiconducting insulation shield of the cable is terminated. This semiconducting shield is designated by the reference character 22. Such stress cones are commonly used at such locations on high voltage cables, and this invention is concerned with a stress cone constructed on the cable 10 which is to be connected with a high-voltage transmission line. A stress shield 24 can be used to surround the end portion of the semiconducting shield 22 in accordance with conventional construction. The stress cone 20 is enclosed within an insulation housing 30, and the cable insulation 32 terminates at 34, leaving the cable conductor, indicated by the reference character 10', extending beyond the insulation 32. A connector 36 fits over the bare cable conductor 10' which is part of the overhead transmission line, or other circuit to which the cable 10 is to be connected. A corona shield 38 is located at the end of the insulator 30 in accordance with conventional practice.

FIG. 2 shows the way in which a stress cone blank 40 is applied over the insulation of the wire 10 from which the semiconducting shield 22 has been turned back. This blank 40 is most conveniently made by wrapping insulating tape around the insulation of the cable 10 to form sleeve portions 42 and tapered portions 44 and 46 which slope upward to a portion 48 where the blank 40 has its maximum diameter which fits within a cylindrical enclosure such as the enclosure 30 of FIG. 1.

After the stress cone blank 40 has been built up to the approximate desired size and shape, as shown in FIG. 2, it is placed in the cylindrical enclosure 52, with the cable 10 extending from both ends of the enclosure 52, as shown in FIG. 3. There are two retractable molding or shaping members 54 and 56 which have axial openings through which the cable 10 passes, and these molding members fit inside the cylindrical enclosure 52 and slide axially therein like pistons. The faces of the molding members 54 and 56, which confront one another, have the desired contour for the final shape of the stress cone 20. With the plastic of the stress cone blank heated so that its shape can be changed by sufficient pressure, the molding members 54 and 56 are moved toward one another under high pressure to shape the stress cone 20 to the desired final contour, from its original shape shown in full lines in FIG. 2 and in dotted lines 40 for the lower half in FIG. 3. A heater 57 is shown diagrammatically in FIG. 3.

The approximate shape of the stress cone blank 40 is shown in broken lines in FIG. 3, and the final shape imposed on the blank by the molding member 54 and 56 is shown in full lines. Before the shaping of the stress cone is begun, the semiconducting shield 22 is placed on the working face of the molding member 54 so as to extend up to a hump 60 which is the portion of the molding member 54 that projects furthest toward the confronting molding member 56.

This projecting portion 60 shapes the confronting face of the stress cone 40 to a smaller angle of taper and forms an annular recess in the end face of the stress cone with a cross-section corresponding to that of the projecting portion 60 of the molding member 54. The semiconducting shield 22 is brought into intimate contact with the tapered base of the stress cone and the end of the shield 22 is located at the most There is a pressurizing plate 64 behind each of the molding members 54 and 56. A sealing plate 66 is connected with each of the pressurizing plates by fastening means, such as the screw 68, shown at the lower left-hand portion of FIG. 3; and there are similar screw fastenings 68 at angularly spaced regions around the axes of the sealing plates 66 and the pressurizing plates 64.

Sealing rings 69 fit into grooves in the outer and inner circumferences of the sealing plates 66 with the grooves closed on one side by discs 70 which are clamped between the pressurizing plates 64 and the sealing plates 66.

The sealing plates 66 are connected to the molding members 54 and 56 by screws 72 at angularly spaced locations around the sealing plate and molding shapes; and one of these screws 72 is shown on the plane of section of FIG. 3.

During the shaping of the stress cone, heat is applied to the outside of the cylindrical enclosure 52 in any conventional manner to soften the plastic material in the mold enclosure 52 to heat the molding members 54 and 56 which transmit their heat to the plastic material of the stress cone. The molding members 54 and 56 are preferably made of aluminum or other hard metal, and being made of metal conduct heat readily to the plastic stress cone 20 which is preferably built-up by winding tapes of insulation over the insulation of the cable 10.

In the preferred construction, pressure is preferably applied to the molding members 54 and 56 by hydraulic motors 74 which have piston rods 76 screwed into the pressurizing plates 64. In order to protect the motors 74 from the heat which is applied to the stress cone by the molding members 54 and 56, there is thermal insulation 78 interposed between the sealing plates 66 and the molding members 54 and 56.

After the stress cone 20 has been formed to the desired contour by heat and pressure applied by the heated molding members 54 and 56, no further heat is applied, but the cone 20 is maintained under high pressure fluid introduced into the enclosure 52 through ports 77, and the pressure is maintained while the cone 20 cools and shrinks so as to prevent formation of shrinkage voids.

The motors 74 have end portions 80 of their cylinders 74 screwed into openings 82 in flanges 84 which have sockets 86 for receiving the ends of the cylindrical enclosure 52. These sockets maintain the flanges 84 in axial alignment with each other and with the cable 10. They also maintain the motors 74 with their pistons 76 in alignment with the connections that join the piston rods 76 to the pressurizing plates 64.

Each of the flanges 84 is made in two parts, so that they can be split along a plane which passes through the axis of the cable 10. This construction is shown in FIG. 4 where an upper portion 84a separates from a lower portion 84b along a plane 90. The upper part 84a is secured to the lower part 84b by bolts 92 which extend for the full height of each of the flanges 84.

The flanges 84 are clamped firmly against opposite ends of the cylindrical enclosure 52 by four tie rods 98 with nuts 100 on the ends of the tie rods. This construction is best shown in FIG. 5.

Figure 6:
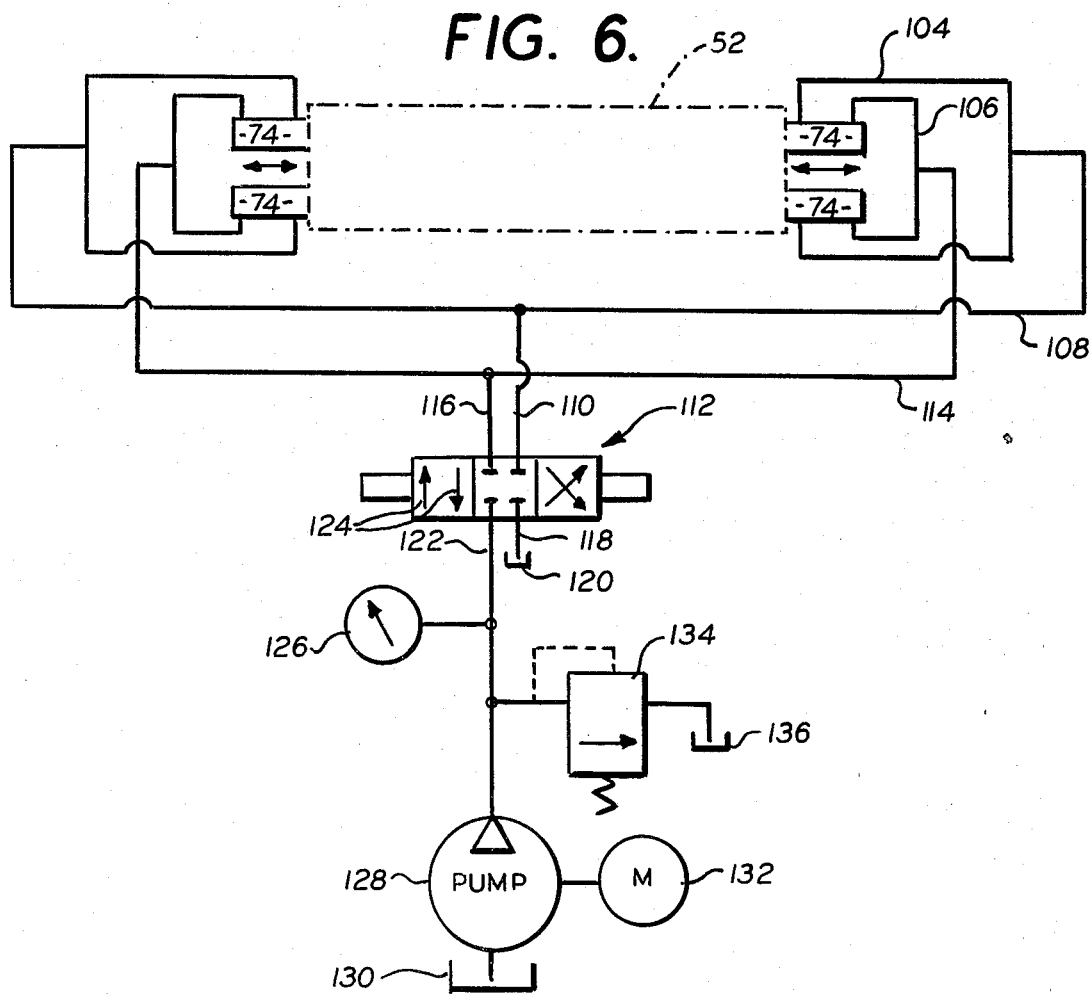
FIG. 6 is a piping diagram showing the way in which working fluid is supplied to the hydraulic motors of FIG. 3 in order to obtain simultaneous double action for advancing and retracting the molding shapes and for maintaining a fixed maximum pressure on the insulation material during the making of a stress relief cone, as shown in FIG. 3.

FIG. 6 is a diagrammatic view showing the application of power to the hydraulic motors 74 at opposite ends of the cylindrical enclosure 52. The upper right-hand motor 74 in FIG. 6. has a fluid line 104 coming to the crank end of the motor and another fluid line 106 coming to the head end of the motor. The pipe 104 communicates with a pipe 108 leading to another pipe 110 which communicates with ports of a valve 112.

The fluid line 106 communicates with a pipe 114 which is connected by a pipe 116 with the two-position valve 112.

When the valve 112 is in one position, the pipe 108 connects with a pipe 118 leading to a sump 120, whereas the pipe 116 is connected with a high pressure fluid supply line 122, as indicated by the parallel arrows 124.

When the valve 112 is in its second position, it connects the pipe 110 with the fluid pressure supply line 122 and connects the pipe 116 to the sump pipe 118.

All of the motors 74 are connected with the same valve 112 and piping is such that the motors move the molding shapes toward one another at the same time and move them away from one another when the motors reverse.

The piping diagram of FIG. 6 also shows a pressure gauge 126 on the fluid supply line 122. A force pump 128 withdraws working fluid from a fluid supply reservoir 130 when the pump is driven by a motor 132. A pressure relief valve 134 permits excessive pressure in the pipe 122 to escape into a sump 136. Ordinarily, the sumps 120 and 136 will drain back to the supply reservoir 130 through strainers.

The preferred embodiment of the invention has been illustrated and described, but changes and modifications can be made and some features can be used in different combinations without departing from the invention as defined in the claims.

What is claimed is:

1. Apparatus for molding, at its place of use on the termination of an insulated high voltage power cable, a tapered-surface stress control cone having a semi-conducting shield on one of its tapered surfaces, wherein the molding is made from a stress-control blank or preform provided on said cable, said preform approximating the shape of said resulting stress control cone, said apparatus comprising:
   a split cylindrical enclosure having end flanges, and being of such length that it is adapted to surround said preform and at least portions of said cable that extend beyond opposite ends of the tapered surfaces of said perform,
   means to heat said enclosure,
   a pair of slidable split complementary molding members within said enclosure and being adapted to surround said portions of said insulated cable within said enclosure, said molding members having inner confronting tapered faces extending from the surface of said cable to the inner surface of said enclosure for molding said preform to its final shape upon the application of heat and pressure,
   a pair of pressurizer end plates fitting within said cylindrical enclosure and spaced from one another along the length of the enclosure and beyond the outer faces of said mold members, said end plates having central openings through which said insulated cable passes and being adapted to transmit forces by sliding movement to said molding members during the molding of said stress control cone,
   means to apply forces on said end plates for transmittal to said molding members, and
   means to provide a fluid under pressure within said enclosure during the cooling of said molded stress control cone to prevent the formation of voids therein.

2. The apparatus as defined in claim 1, wherein heat insulation is interposed between the outer faces of said molding members and the inner faces of said pressurizer end plates.

3. The apparatus as defined in claim 1, wherein a passage through the wall of said enclosure is provided to introduce said fluid under pressure into said enclosure, and sealing rings are provided on the circumference of said slidable end plates to seal the fluid within said enclosure during the molding of said stress control cone.

4. The apparatus as defined in claim 1, wherein said means to apply forces on said end plates for transmittal to said molding members comprises at least one fluid operated motor.

5. The apparatus as defined in claim 4, wherein said at least one fluid operated motor comprises at least one hydraulic motor mounted on an end flange of said enclosure.

6. The apparatus as defined in claim 5, wherein said at least one hydraulic motor is connected to the end plate by a piston rod, and said at least one hydraulic motor is connected to an end flange by a cylindrical alignment member.

7. The apparatus as defined in claim 6, wherein a pump is adapted to supply the working fluid to the hydraulic motors and an adjustable relief valve is adapted to limit the pressure of the hydraulic fluid whereby automatic control of the maximum pressure exerted by said mold members on said preform is attained.

8. The apparatus as defined in claim 6, wherein said at least one hydraulic motor comprises a pair of hydraulic motors each of which is symmetrically mounted on said flange on opposite sides of the cable.

9. The apparatus as defined in claim 6, wherein said flanges are removable, contact the end of said enclosure and extend beyond the circumference of said enclosure, said flanges having openings for said cable and said piston rod of said at least one hydraulic motor and being fastened to said enclosure by connecting means extending between said flanges which are mounted on opposite ends of said enclosure.

10. The apparatus described in claim 8 wherein a pump supplies working fluid to said at least one hydraulic motor and an adjustable relief valve limits the pressure of the hydraulic fluid, thereby providing an automatic control on the maximum pressure that said molding members exert on said blank or preform that is built-up around the insulation on the cable to form the stress control cone.

11. The apparatus described in claim 10 wherein each of said hydraulic motors is a double-acting cylinder-piston motor, and wherein valve means between the working fluid supply and both of said hydraulic motors is movable to change the supply of fluid to said motors after the shaping of each stress control cone blank or preform is completed and the resulting stress control cone has cooled to the approximate temperature of the ambient atmosphere.

12. The apparatus as defined in claim 9, wherein said connecting means comprises tie rods located at symmetrical positions outside of said enclosure and each rod has threaded ends with detachable fastening means for connecting and disconnecting said flanges from said enclosure, and said flanges comprise a pair of sections with detachable fastening means to enable said flanges to be removed from their working position surrounding said cable.

13. The apparatus as defined in claim 1, wherein each of said pair of slidable split complimentary molding members comprises a pair of mold member parts which join together to form a continuous mold member structure surrounding said cable with each pair of mold members defining a circular opening through which the cable passes, said pair of mold member parts each having a shaping surface that confronts the outer surface of the insulation of said cable to shape said insulation, but is limited in its circumferential angular extent so as to clear the cable when moved away from the cable when said mold member parts are separated from each other.

14. The apparatus as defined in claim 1, wherein each pair of said slidable split complimentary molding members within said enclosure has an inside shaping surface that is tapered along a portion of its length and that increases in diameter as it extends toward the other pair, the maximum diameter of the tapered portion of one pair of split complimentary mold members being substantially less than that of the other pair, said one pair of members having a lip that projects toward the other pair with a radially outer surface that recedes away from the other pair, thereby to form on a cable a stress control cone (a) with a first tapered portion that increases in cross-section to the maximum diameter of said cone, said first tapered portion having a projecting lip of insulation projecting axially and located radially outward of a molded recess, said lip merging with the surface of the conical tapered surface of said cone furthest from the termination of the cable and (b) with the semi-conducting shield extending up said conical tapered surface to the region of said lip.

* * * * *